(12) United States Patent
Orriss et al.

(10) Patent No.: US 7,054,150 B2
(45) Date of Patent: May 30, 2006

(54) MOUNTING FOR DISK DRIVE UNIT AND METHOD OF HANDLING

(75) Inventors: David J. Orriss, Waterlooville (GB); Andrew W. Atkins, Southampton (GB)

(73) Assignee: Xyratex Technology Limited, Hampshire (GB)

( * ) Notice: Subject to any disclaimer, the term of this patent is extended or adjusted under 35 U.S.C. 154(b) by 1 day.

(21) Appl. No.: 10/487,404

(22) PCT Filed: Aug. 22, 2002

(86) PCT No.: PCT/GB02/03871

§ 371 (c)(1),
(2), (4) Date: Aug. 2, 2004

(87) PCT Pub. No.: WO03/021597

PCT Pub. Date: Mar. 13, 2003

(65) Prior Publication Data

US 2004/0264121 A1 Dec. 30, 2004

Related U.S. Application Data

(60) Provisional application No. 60/315,350, filed on Aug. 29, 2001.

(51) Int. Cl.
*G06F 1/16* (2006.01)

(52) U.S. Cl. ............ 361/685; 361/684; 248/618; 248/636

(58) Field of Classification Search ........ 361/683–686, 361/724–733; 312/332.1, 333; 369/75.11; 248/618, 633, 634, 636, 638; 414/280
See application file for complete search history.

(56) References Cited

U.S. PATENT DOCUMENTS 5,216,582 A * 6/1993 Russell et al. .............. 361/685
5,220,548 A * 6/1993 Nakatsukasa et al. .... 369/30.45

(Continued)

FOREIGN PATENT DOCUMENTS

| DE | 297 13 122 U1 | 10/1997 |
| EP | 1 014 369 A2 | 6/2000 |
| GB | 2 342 759 A | 4/2000 |
| JP | 4-171326 | 6/1992 |
| WO | WO 97/06532 | 2/1997 |
| WO | WO 01/41148 | 6/2001 |

OTHER PUBLICATIONS

Copy of International Search Report dated Dec. 10, 2002.
Copy of European Search Report dated Mar. 5, 2002.

*Primary Examiner*—Lynn Feild
*Assistant Examiner*—Anthony Q. Edwards
(74) *Attorney, Agent, or Firm*—Pillsbury Winthrop Shaw Pittman LLP

(57) ABSTRACT

A mounting for a disk drive unit includes a carrier for carrying a disk drive unit during required movement of the disk drive unit. The carrier defines a space into which the disk drive unit can be inserted, and the carrier is adapted to be inserted with the disk drive unit into a receiving frame for operational use. At least two resilient devices are mounted on the carrier for securing the disk drive unit in the receiving frame when the carrier is inserted into the frame, at least one resilient device being mounted on each side of the carrier to allow movement of the device as a whole relative to the carrier, and the resilient device is arranged to secure the disk drive unit in the receiving frame by acting between the disk drive unit and the receiving frame. A method of handling the disk drive unit includes placing the disk drive unit into the carrier engaging a robotic device with a coupling structure projecting from the front of the carrier. The method then includes lifting the carrier by the robotic device and inserting the carrier into a receiving frame by a substantially horizontal movement.

18 Claims, 8 Drawing Sheets

U.S. PATENT DOCUMENTS

| | | |
|---|---|---|
| 5,463,527 A | 10/1995 | Hager et al. |
| 5,734,557 A | 3/1998 | McAnally et al. |
| 5,917,676 A | 6/1999 | Browning |
| 5,940,361 A * | 8/1999 | Proctor .................... 720/725 |
| 6,016,249 A * | 1/2000 | Ogawa et al. ............ 361/685 |
| 6,069,789 A * | 5/2000 | Jung ........................ 361/684 |
| 6,166,901 A | 12/2000 | Gamble et al. |
| 6,209,842 B1 | 4/2001 | Anderson et al. |
| 6,249,432 B1 * | 6/2001 | Gamble et al. ............ 361/685 |
| 6,535,381 B1 * | 3/2003 | Jahne et al. ............... 361/685 |

* cited by examiner

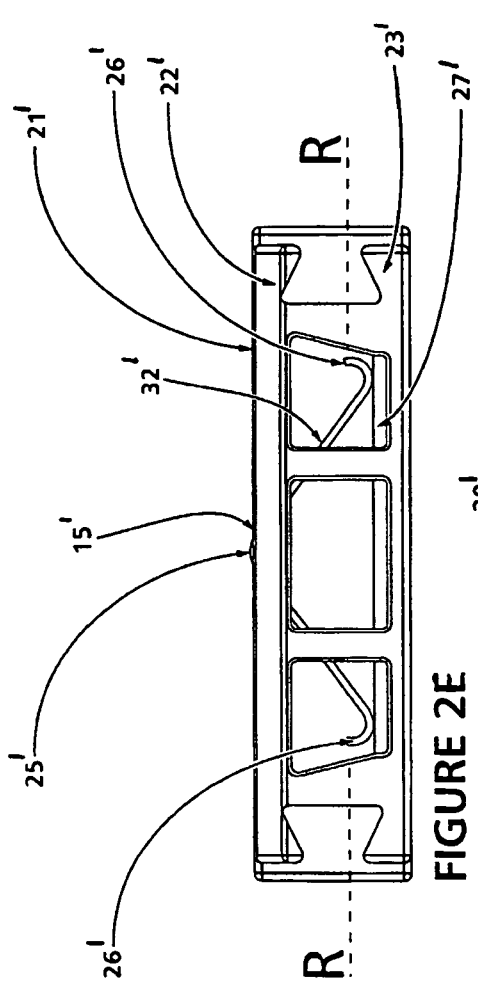
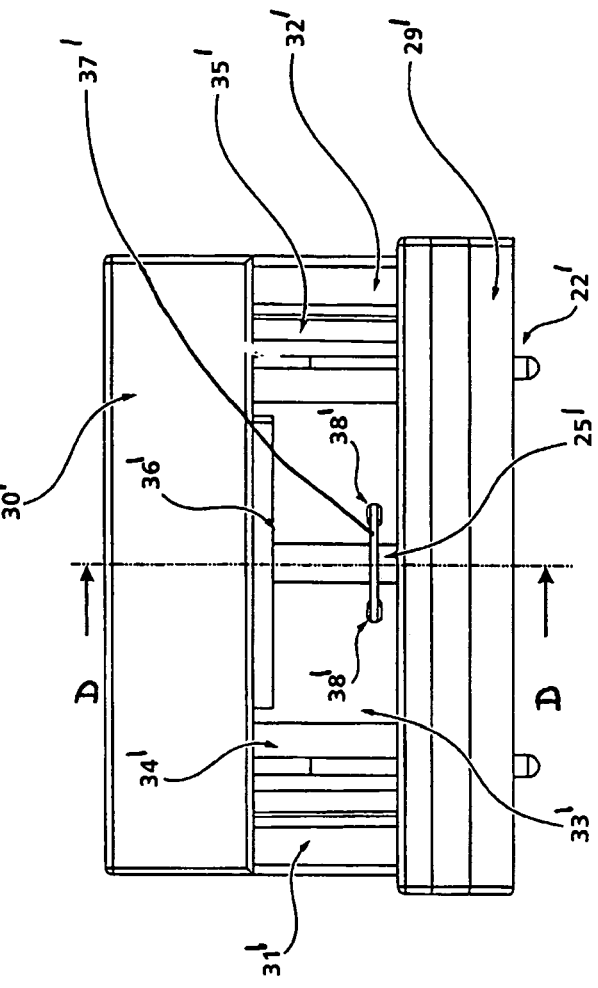
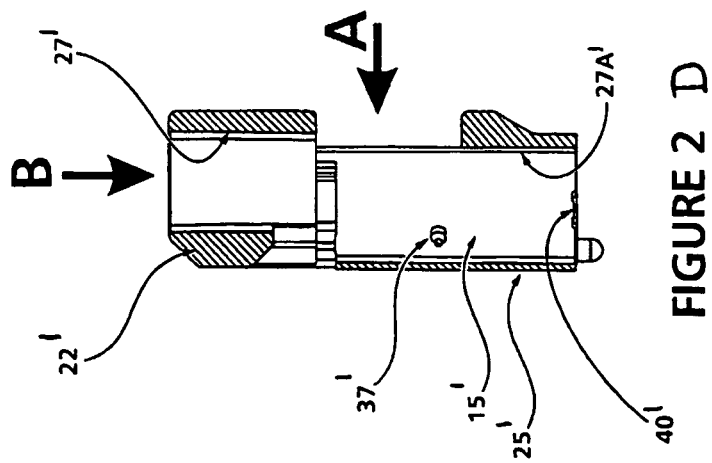
FIGURE 2E
FIGURE 2C
FIGURE 2D

MOUNTING FOR DISK DRIVE UNIT AND METHOD OF HANDLING

This application is the National Phase of International Application PCT/GB02/03871 filed Aug. 22, 2002 which designated the U.S. and that International Application was published in English under PCT Article 21(2) on Mar. 13, 2003 as International Publication No. WO 03/021597 A1. PCT/GB02/03871 claims priority to U.S. Provisional Application No. 60/315,350, filed Aug. 29, 2001. The entire contents of these applications are incorporated herein by reference.

The present invention relates to a mounting for a disk drive unit which has a data storage disk, a movable disk head and main body supporting the disk and the head, and also relates to a method of handling a disk drive unit.

In a conventional disk drive unit the data storage disk is usually mounted horizontally for rotation about a vertical axis, and is mounted in a main chassis body. The disk head, which may be a read only head or a read and write head, is movably mounted on the main body of the disk drive unit, for movement over the disk to desired tracks. Although in some circumstances the disk drive unit may be permanently and rigidly fixed in a frame of other equipment, it often occurs that the disk drive unit must be mounted so as to be easily removable from a supporting frame. For example in a tester rack it is conventional to fit each disk drive unit into a separate carrier moulded of plastics material, and for the carrier then to be slotted into the tester rack. In other applications, a removable disk drive unit may be removably mounted in a computer.

In some arrangements the disk drive unit may be mounted vertically for rotation about a horizontal axis. In general in this specification where an example of a disk drive unit is described with the disk in a horizontal plane, it is to be appreciated that the description applies equally well to a disk drive unit positioned in a vertical plane for rotation about a horizontal axis, or indeed in other configurations where appropriate.

A problem which arises in the operation of disk drive units occurs at the end of the seek movement of the disk head to a desired track. The access acceleration and deceleration of the actuator, containing the read/write heads, particularly on high performance disk drive units, results in an equivalent reaction to the main body of the disk drive unit. This reaction can cause the disk drive unit to oscillate in its mounting, and hence the reaction provides an input to the disk drive unit. The result is unwanted misregistration of the head to the track. In recent years the actuators on disk drive units have generally changed from linear to rotary operation, the read/write heads being moved in an arc across the disk, about a vertical axis (for a horizontal disk) positioned on the main body of the disk drive unit, outside the perimeter of the disk. The vibrations arising from acceleration and deceleration of such a rotary actuator produce rotary oscillation of the main body of the disk drive unit in a horizontal plane.

One way of reducing or avoiding the effects of such vibration is to mount the main body of the disk drive unit very firmly in a grounded frame, secured against rotary vibration, and another method is to mount the main body of the disk drive unit on a floating mounting, or one which allows movement only at such a low frequency that the actuator servo can follow the vibration with only a small error. If the disk drive unit is not mounted at one of these extremes (rigidly mounted or on a floating mounting) the mount vibration will appear on the head/track error signal after the disk drive unit has met its on-track criteria. The resulting misregistration is detected, causing what is generally known as a Write Fault Error, preventing the disk drive unit from writing, with a consequent reduction in performance of the disk drive unit.

In situations where easy removability of the disk drive unit is required, mounting at either of the extreme situations mentioned above is difficult. In a disk drive unit tester rack for example, removal should be as simple as possible. The tester should also be space efficient, which rules out a low frequency mount option since this would require too large a space. Finally, the tester frame should be capable of manufacture at a reasonably low cost.

In WO 01/41148 there is disclosed apparatus for testing disk drive units including a supporting structure for supporting a disk drive unit, referred to in the disclosure as a disk drive unit carrier, adapted to carry a disk drive unit and a temperature control device for controlling the temperature of the disk drive unit to be at a predetermined temperature during operation of the disk drive unit. An air flow control device controls the flow of air across the disk drive unit. In some arrangements there may be provided disk drive unit test apparatus for receiving a plurality of disk drive units, the test apparatus comprising a plurality of carriers each for receiving a respective disk drive unit. In the example described in this specification, the carrier has a door at the front which can be opened or removed to allow a disk drive unit to be inserted into or removed from the carrier. A plurality of such carriers can be incorporated in or assembled into disk drive unit test apparatus, such as for example a test rack. This allows individual disk drive units to be moved into and out of the test apparatus.

It has been known in the past to secure a disk drive unit rigidly in a carrier by use of wedges. In WO 97/06532 a mounting for a disk drive unit comprises a supporting structure for supporting a disk drive unit, referred to in the disclosure as a carrier, defining a space into which the disk drive unit can be removably inserted for operational use. The carrier has a base and two opposed sides, and first and second wedge means which are movable to act between the main body of the disk drive unit and the side of the carrier, to secure the disk drive unit against movement relative to the carrier. The wedge means include wedges which are movable in a vertical direction by a control linkage operated automatically when the disk drive unit is inserted into the carrier. A disadvantage of the rigid mounting disclosed in WO 97/06532, is that where a plurality of disk drive units are mounted together in a common frame, for example in a tester, the rigid mounting results in cross torque between adjacent disk drive units during testing. Thus the rigid mounting allows transmission of high frequency disturbances from one disk drive unit to another. Thus although the rigid mounting can cure errors arising from the inertia of the disk head during movement, it can result in a further difficulty in cross talk (i.e. the transmission of vibration between adjacent drives) between disk drive units.

In U.S. Pat. No. 6,209,842 (Anderson et al) there is disclosed a mounting for a disk drive unit comprising a carrier for carrying the disk drive unit and four resilient members referred to as damping devices mounted on the carrier for securing the disk drive unit in a receiving frame, referred to as a system cabinet. The resilient elements are positioned two on each side of the carrier, two positioned towards the front of the carrier and two positioned towards the rear of the carrier. In operation the disk drive unit is mounted in the carrier which in turn is pushed into a bay defined by side walls of the bay. The damping devices are mounted on the carrier by bolts. Each damping device has a planar portion fastened by the bolt and a V-shaped portion which is cantilevered from the bolt. The damping device acts between the wall of the system bay and the wall of the carrier.

It is an object of the present invention, at least in preferred embodiments, to provide a mounting for a disk drive unit which allows easy insertion and removal of a disk drive unit into and out of a carrier, and an effective method of handling a disk drive unit.

According to the present invention in one aspect there is provided a mounting for a disk drive unit having a data storage disk, a movable disk head, and a main body supporting the disk and disk head, the mounting comprising a carrier for carrying a disk drive unit during required movement of the disk drive unit, the carrier defining a space into which the disk drive unit can be inserted, and the carrier being adapted to be inserted with the disk drive unit into a receiving frame for operational use; and at least one retaining device mounted on the carrier for securing the disk drive unit in the receiving frame when the carrier is inserted into the frame; in which the or each retaining device is movably mounted on the carrier to allow movement of the device as a whole relative to the carrier, and the or each retaining device is arranged to secure the disk drive unit in the receiving frame by acting directly between the disk drive unit and the receiving frame.

Conveniently the or each retaining device is arranged to act between the disk drive unit and the receiving frame in use, by the effect of compression of the retaining device between the disk drive unit and the carrier. Preferably the or each retaining device is arranged to be compressed between the disk drive unit and the receiving frame by the effect of the movement of the carrier into the receiving frame.

In a particularly preferred form of the mounting it may be arranged that the or each retaining device is movable between a first retracted position in which the retaining device is retracted wholly or partially outside the said space in the carrier, allowing the disk drive unit to be inserted into the carrier, and a second operating position in which the retaining device extends into the said space in the carrier and bears against the disk drive unit to a greater extent than in the first position. The resilient member may include an outwardly extending actuating surface adapted to co-operate with a portion of the receiving frame, in such a way that when the carrier is located in the frame, the portion of the frame bears against the said actuating surface and pushes the retaining device inwardly to bear against the disk drive unit which is located in the carrier.

In one particularly preferred form, it may be arranged that the or each retaining device is mounted in a wall of the carrier and extends inwardly towards the said space in the carrier for the disk drive and outwardly to engage the receiving frame when the carrier is inserted in the receiving frame. In one arrangement the or each retaining device has a portion which protrudes inwardly towards the said space for the disk drive unit and which is inclined to a perpendicular to a floor of the carrier, the inclination being in a sense such that the insertion of a disk drive unit into the space causes the disk drive unit to engage with the inclined portion of the retaining device, and to progressively move the retaining device outwardly as the disk drive unit is inserted into the space. Also in a preferred form, the retaining device has a portion which extends outwardly into a recess in the side of the carrier which recess is adapted to co-operate with a supporting rail on the receiving frame such that when the carrier is inserted into the receiving frame, the rail engages with the outwardly protruding portion of the retaining device, and compresses the retaining device between the rail and the disk drive unit in the carrier.

Conveniently there may be provided four of said retaining devices positioned with two retaining devices towards the front of the carrier and two retaining devices towards the rear of the carrier, relative to the direction of insertion of the carrier into the receiving frame. However in other arrangements there may be provided more than four retaining devices or less.

In one particularly form, each side of the carrier has an opening exposing the side of the disk drive unit when the disk drive unit is in the carrier, the opening being shaped to allow the disk drive unit to be deposited into or lifted from the carrier by gripping the exposed sides of the disk drive unit. Such an arrangement is convenient in an automated system for moving the disk drive unit. Also in such a system it may be arranged that the carrier has a coupling structure projecting outwardly from a front of the carrier adapted to be engaged by a robotic device for moving the carrier into and out of the frame.

In accordance with another aspect of the invention, there may be provided a mounting as has been set out hereinbefore, in combination with a receiving frame into which the carrier can be inserted with a disk drive unit for operational use of the disk drive unit. The receiving frame may take a number of different forms. In one example the receiving frame comprises a tester rack adapted to receive a plurality of carriers with respective disk drive units for testing the disk drive units. In another example the receiving frame comprises a data storage assembly adapted to receive a plurality of carriers with respective disk drive units for operational use of the disk drive units for data storage. In another example the receiving frame comprises a frame of a computer adapted to receive a single carrier with its associated disk drive unit for data processing.

In preferred forms of the mounting the or each retaining device comprises a resilient member. It is particularly preferred that each resilient member is formed of a sheet of resilient material. Conveniently the sheet of resilient material has at least one bend line about which the sheet is bent to provide two portions of the sheet inclined to each other at an obtuse angle, the resilience of the resilient member being provided by compressing of the resilient member by opening of the obtuse angle. Preferably the resilient member is positioned so as to act against an outer side of the disk drive unit when it is inserted in the carrier, the said bend line or lines being arranged in a plane or planes substantially parallel to the outer side of the disk drive unit when it is inserted into the carrier.

In accordance with another aspect of the invention there is provided a method of handling a disk drive unit comprising the steps of placing a disk drive unit into a carrier for carrying the disk drive unit during required movement of the disk drive unit; engaging the carrier by engaging a robotic device with a coupling structure projecting from the front of the carrier; lifting the carrier by the robotic device and inserting the carrier into a receiving frame by a substantially horizontal movement; and releasing the robotic device from the coupling structure on the carrier.

In a preferred form of the method, the step of placing the disk drive unit into the carrier comprises picking up the disk drive unit by a further robotic device by gripping the unit at the sides thereof; and depositing the disk drive unit into the carrier by lowering the unit into the carrier whilst gripped at the sides and releasing the further robotic device from the sides of the unit after the unit is housed in the carrier.

Also in preferred forms, the method includes retaining the disk drive unit in the frame by a retaining assembly adapted to act between the main body of the disk drive unit and the receiving frame, and actuating the retaining assembly to retain the disk drive unit in the frame by the effect of the movement of the carrier into the receiving frame.

Preferably the method includes retaining the disk drive unit in the frame by means of resilient members bearing against the sides of the disk drive unit and being resiliently biased inwardly against the disk drive unit, each resilient member being movable between a first retracted position in which the resilient member is retracted wholly or partially outside the space in the carrier for receiving the disk drive unit and a second operating position in which the resilient member is biased towards the said space in the carrier to a greater extent than in the first position; the method comprising depositing the disk drive unit into the carrier, including moving each resilient member to the said retracted position by the effect of the movement of the disk drive unit into the carrier; and moving the carrier into the receiving frame, including moving the resilient member into the second operating position by the effect of the movement of the carrier into the receiving frame.

In accordance with another aspect of the invention there is provided a mounting for a disk drive unit having a data storage disk, a movable disk head, and a main body supporting the disk and disk head, the mounting comprising a carrier for carrying the disk drive unit during required movement of the disk drive unit, the carrier defining a space into which the disk drive unit can be inserted, and the carrier being adapted to be inserted with the disk drive unit into a receiving frame for operational use; in which the carrier has a coupling structure projecting outwardly from a front of the carrier adapted to be engaged by a robotic device for moving the carrier into and out of the frame.

Preferably the mounting includes a latch for securing the carrier in the said frame, and a latch actuator mounted on the coupling structure and adapted to co-operate with the robotic device to release the latch automatically upon engagement of the coupling structure by the robotic device.

In accordance with the invention in a yet further aspect there is provided a mounting for a disk drive unit having a data storage disk, a movable disk head, and a main body supporting the disk and disk head, the mounting comprising a carrier for carrying the disk drive unit during required movement of the disk drive unit, the carrier defining a space into which the disk drive unit can be inserted, and the carrier being adapted to be inserted with the disk drive unit into a receiving frame for operational use; in which each side of the carrier has an opening exposing the side of the disk drive unit when the disk drive unit is in the carrier, the opening being shaped to allow the disk drive units to be deposited into or lifted from the carrier by gripping the exposed sides of the disk drive unit.

In both aspects, it is preferred that the mounting includes a retaining assembly for securing the disk drive unit in a required position, the retaining assembly being mounted on the carrier and being operable to retain the disk drive unit in the receiving frame when the carrier is inserted into the frame. Preferably the retaining assembly is actuated by the effect of the movement of the carrier into the receiving frame. Also preferably the retaining assembly is adapted to secure the disk drive unit in the receiving frame by acting between the disk drive unit and the receiving frame. It is particularly preferred that the retaining assembly comprises resilient members arranged to retain the disk drive unit by bearing against the sides of the disk drive unit and by being resiliently biased inwardly against the disk drive unit. In such an arrangement it is preferred each resilient member is movable between a first retracted position in which the resilient member is retracted wholly or partially outside the said space in the carrier, allowing the disk drive unit to be inserted into the carrier, and a second operating position in which the resilient member extends into the said space in the carrier and bears against the disk drive unit.

In some arrangements, conveniently the retaining device includes an outwardly extending actuating surface adapted to co-operate with portions of the receiving frame, in such a way that when the carrier is located in the frame, the portions of the frame bear against the said actuating surface and push the resilient members inwardly to bear against the disk drive unit which is located in the carrier.

In one example, the retaining assembly comprises four resilient members positioned with two resilient members towards the front of the carrier and two resilient members towards the rear of the carrier, relative to the direction of insertion of the carrier into the frame, each side of the carrier having an opening exposing the side of the disk drive unit when the disk drive unit is in the carrier, the opening being shaped to allow the disk drive unit to be deposited into or lifted from the carrier by gripping the exposed sides of the disk drive unit.

The invention finds particular application in a handling assembly comprising a mounting such as has been set out hereinbefore, in combination with a receiving frame into which the carrier can be inserted with the disk drive unit for operational use of the disk drive unit, and a robotic device for moving the carrier into and out of the frame by engaging the robotic device with the coupling structure projecting outwardly from the front of the carrier. Preferably the handling assembly includes a further robotic device for depositing the disk drive unit into the carrier by lowering the unit into the carrier whilst gripped at the sides and releasing the robotic device from the sides of the unit after the unit is housed in the carrier.

It is to be appreciated that where features of the invention are set out herein with regard to apparatus according to the invention, such features may also be provided with regard to a method according to the invention, and vice a versa.

Embodiments of the invention will now be described by way of example with reference to the accompanying drawings in which:

FIG. 2C is a view from the side of a modified spring unit of a retaining device adapted to retain a disk drive unit in the mounting shown in FIG. 1, modified from the unit shown in FIG. 2;

FIG. 2D is a section along the lines D—D in FIG. 2C, showing the spring unit of FIG. 2C (the view of FIG. 2C being a view in the direction A in FIG. 2D);

FIG. 2E is a diagrammatic plan view from above of the spring unit shown in FIG. 2C, (the view of FIG. 2E being a view in the direction B in FIG. 2D);

Figure 1:
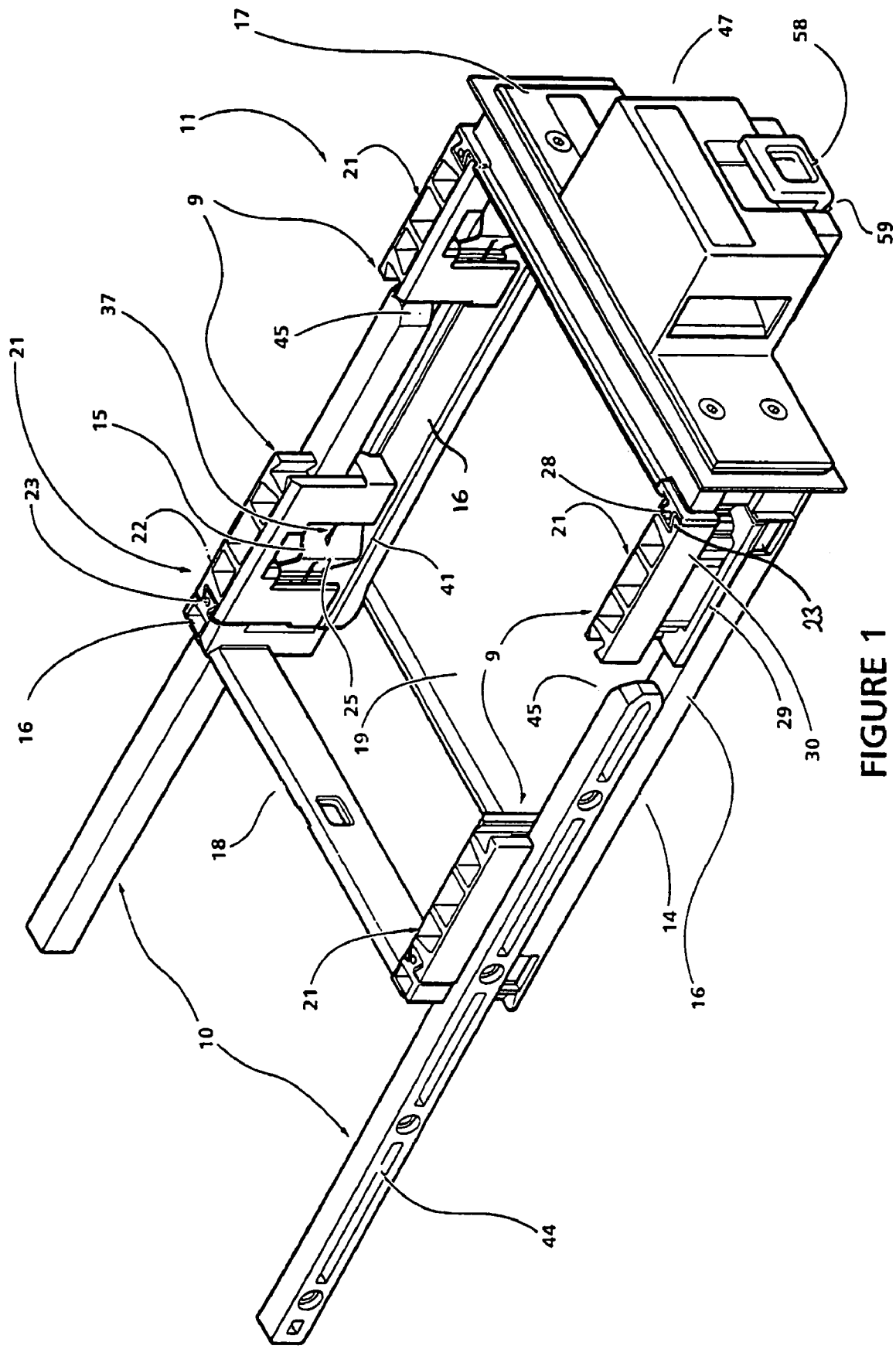
FIG. 1 is a diagrammatic perspective view from above of a mounting for a disk drive unit embodying the invention.
Figure 1A:
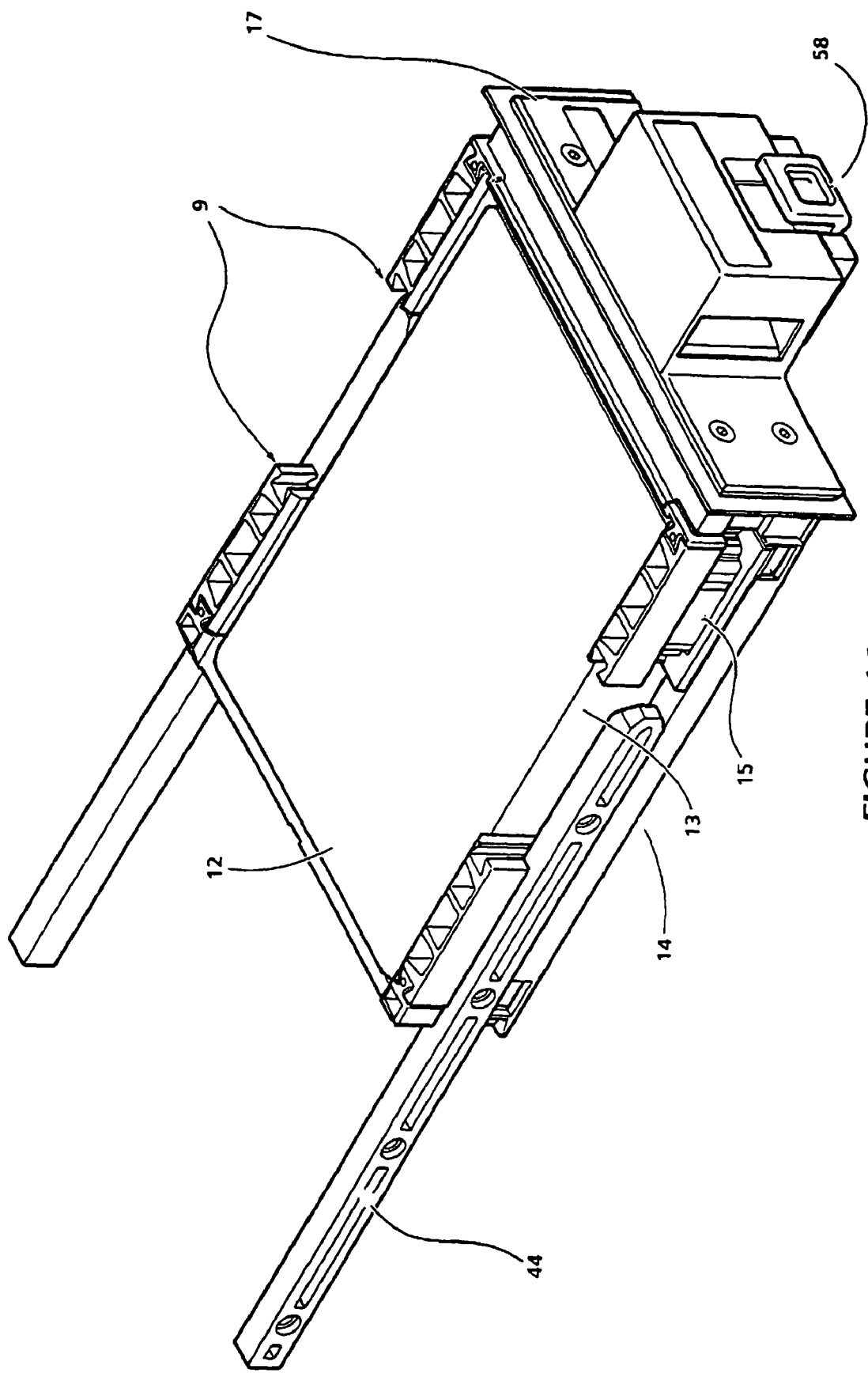
FIG. 1A is the same perspective view of the mounting as shown in FIG. 1, but with a disk drive unit shown housed in the mounting.

FIG. 1 shows a mounting 11 embodying the invention, for a disk drive unit. FIG. 1A shows the mounting 11 with a disk drive unit 12 housed therein. The disk drive unit 12 has a data storage disk and movable disk head (not shown) supported in a main body 13.

Figure 5:
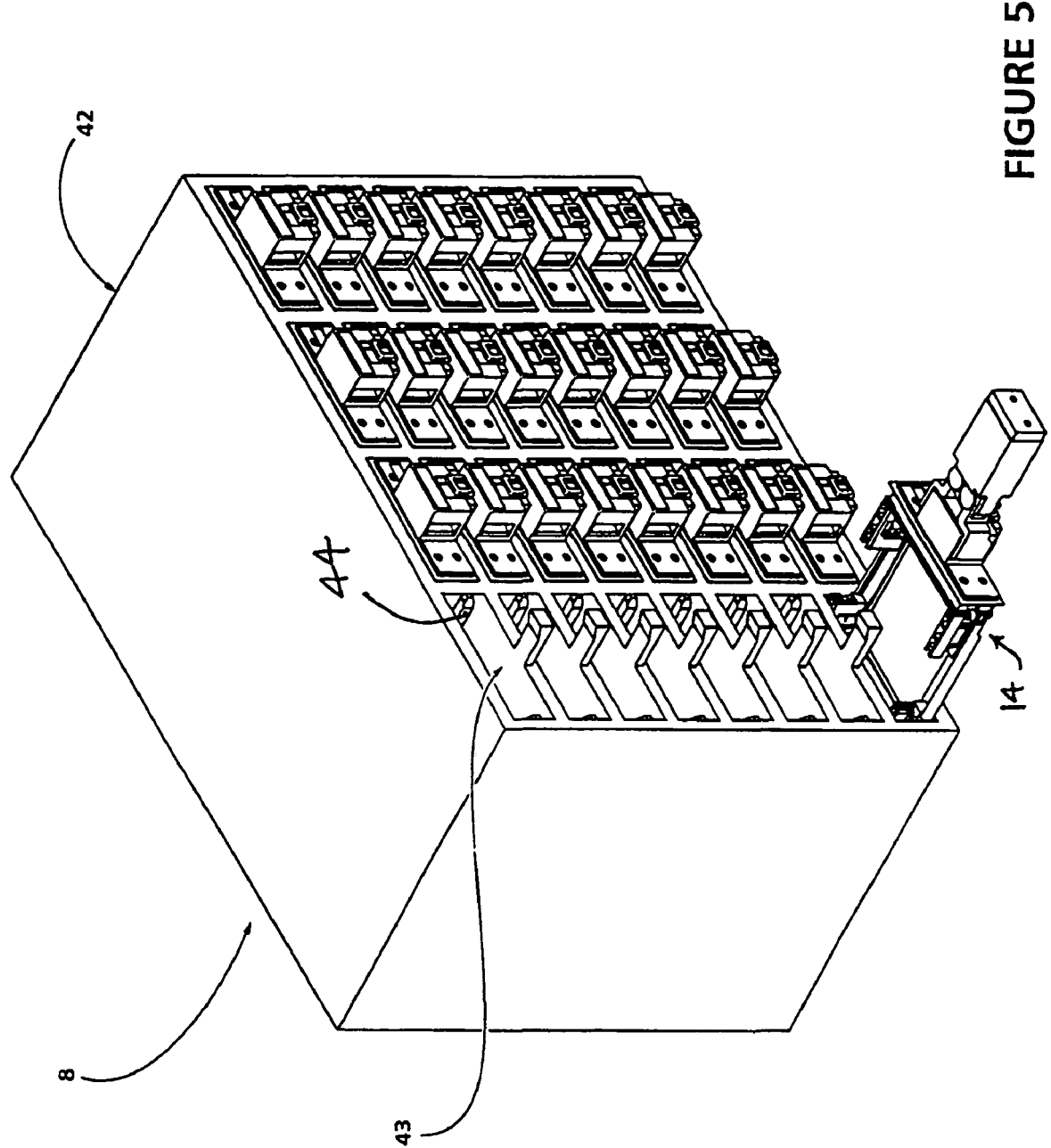
FIG. 5 is a diagrammatic perspective view shown partly from above, of a tester rack for receiving a plurality of disk drive units.

The mounting 11 comprises a carrier 14, also referred to as a carrier tray, for carrying the disk drive unit 12 during required movement of the disk drive unit. The carrier 14 defines a space into which the disk drive unit 12 can be inserted. The carrier 14 is adapted to be inserted with the disk drive unit into a receiving frame 8 shown by way of example in FIG. 5 as a tester rack 42. The receiving frame 8 of FIG. 5 provides a plurality of bays 43 each having a supporting structure 10 (FIG. 1) including a pair of side rails 44, to be described more fully hereinafter. The carrier 14 is formed by two side wall portions 16, a front wall 17, a rear wall 18 and a floor 19. A retaining assembly 9 for retaining the disk drive unit in the carrier includes four retaining devices 15 positioned with two retaining devices 15 towards the front of the carrier 14, and two retaining devices towards the rear of the carrier 14. In this embodiment each retaining device 15 comprises a resilient member 15. Each resilient member 15 consists of a spring which acts between the carrier 14 and the disk drive unit 12. Each resilient member 15 consists of a clamping spring arranged to grip the disk drive unit 12 by bearing against the disk drive unit and by being resilient biased inwardly against the disk drive unit. Each spring 15 is mounted in a sub-frame 22 which forms, with the spring 15, a self contained spring unit 21 which is releasable secured to the side wall portions 16 in such a manner that it can be removed for servicing. The sub-frame 22 is secured by a dovetail joint 23 to the main part of the carrier 14, and is additionally screwed thereto by a screw (not shown).

Figure 2B:
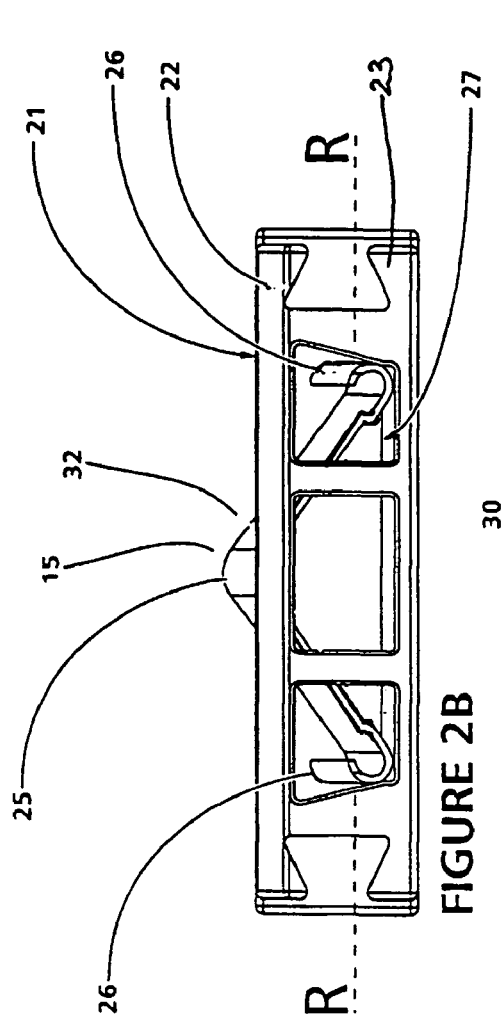
FIG. 2B is a diagrammatic plan view from above of the spring unit shown in FIG. 2, (the view of FIG. 2B being a view in the direction B in FIG. 2A)

Considering now the construction of the spring unit 21 in detail, reference will be made to FIGS. 2, 2A and 2B. As shown in FIG. 2B, each clamping spring 15 consists of a sheet 32 of stiff resilient material bent along a bend line 25 (also referred to as a fold line). The distal ends of the spring 15 are curled to provide rounded ends 26. The curled ends 26 of the clamping spring 15 are intended to bear upon components of a receiving frame (not yet described) into which the carrier 14 is intended to be inserted. As will be described more fully hereinafter, the ends 26 are rounded so that upon compression of the clamping spring 15, the curled ends 26 are free to slide along a bearing surface as the angle of the bend line 25 increases when the spring is in the compressed condition.

FIG. 2B shows the spring units 21 in plan view from above and shows an end view of the dovetail section 23 at each end of the spring unit. Each spring unit is identical, to simplify manufacture. In use, each spring unit is secured by one or other of the dovetail sections 23 sliding into a corresponding protruding section 28 provided on the main carrier structure (FIG. 1). After the spring unit 21 has been secured generally by the two sections of the dovetail 23, 28 sliding relative to each other, the sub-frame 22 is secured by a screw (not shown) extending upwardly through the side wall portion 16 into the base of the sub-frame 22. At the front of the carrier the protruding dovetail section 28 extends from the front wall 17. At the rear of the carrier, the protruding section 28 extends from an end portion 16A of the carrier integral with the side wall portion 16.

Referring again to FIGS. 2 and 2B, each sub-frame 22 comprises a lower base portion 29 and an upper portion 30, linked to each other by two upright side portions 31 and 32 positioned one at each end of the sub-frame 22. The clamping spring 15 has a main portion 33 in which the bend line 25 is formed, and two upright side limbs 34 and 35. The sub-frame 22 has an inner surface 27A on the base portion 29 of the sub-frame, and an inner surface on the upper portion 30 of the sub-frame. The purpose of the inner surfaces is to loosely retain the curled ends 26 of the clamping spring 15.

In addition to the clamping spring 15, the spring unit 21 includes a further spring consisting of a positioning spring 37. This spring is a fine wire which is located by passing through two apertures 38 in the clamping spring 15. The positioning spring 37 is positioned approximately parallel to the base of the carrier and is threaded through the apertures 38 so as to pass on the outer side of the fold line 25 and to be positioned on the inner sides of the curled ends 26, relative to the inside and outside of the carrier 14. The positioning spring 37 extends sideways at each end a distance sufficient to extend behind the side portions 31 and 32 of the sub-frame 22, when seen from the exterior of the carrier 14, as shown in the view of FIG. 2.

The full purpose of the positioning spring 37 will be described more fully hereinafter, but the location of the main components will now be briefly described. In the absence of a disk drive unit 12 in the carrier 14, both the clamping spring 15 and the positioning spring 37 are loosely fitted, relative to each other, and relative to the sub-frame 22.

In the loosely fitted state, the clamping spring 15 is restrained from escaping from the sub-frame 22 by movement outwardly (relative to the carrier 14) by the curled ends 26 contacting the inner surface 27 of the upper portion 30 of the sub-frame 22. The clamping spring 15 is restrained from movement inwardly (relative to the carrier 14) by the positioning spring 37 bearing at its distal ends against the side-portions 31 and 32 of the sub-frame 22. When, as will be described hereinafter, the clamping spring 15 is moved inwardly (relative to the carrier 14) by further components not yet described, the positioning spring 37 bends in a bow shape inwardly towards the inner space of the carrier, and allows the bend line portion 25 to move inwardly into the interior space of the carrier 14. In the absence of any inward force on the curled ends 26, the positioning spring 37 exerts an outward bias on the clamping spring 15 and moves it bodily outwardly to withdraw partially from the interior space of the carrier 14.

Figure 2:
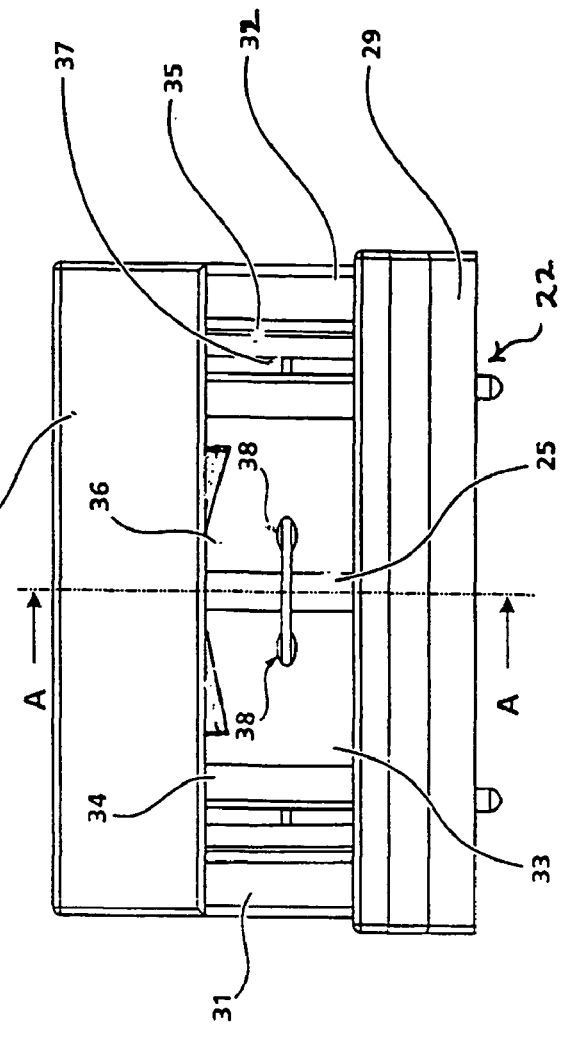
FIG. 2 is a view from the side of a spring unit of a retaining device adapted to retain a disk drive unit in the mounting shown in FIG. 1.
Figure 2A:
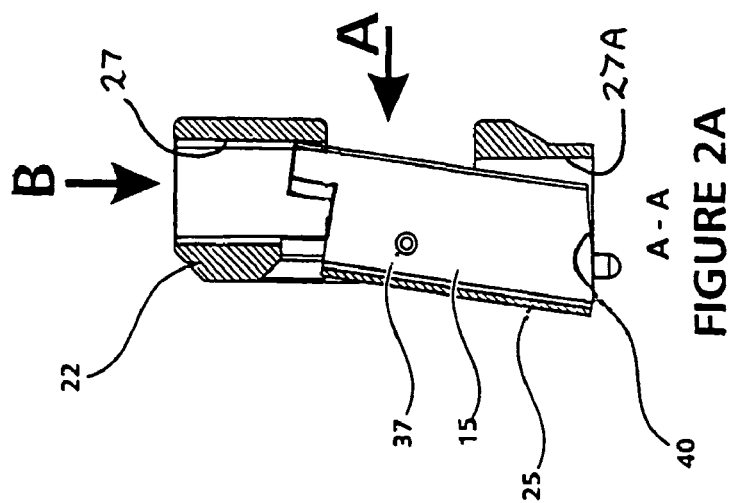
FIG. 2A is a section along the lines A—A in FIG. 2, showing the spring unit of FIG. 2, (the view of FIG. 2 being a view in the direction A in FIG. 2A)

Referring now to FIG. 2A, it will be seen that the lower edge 40 of the clamping spring 15 is shaped to be inclined upwardly in a direction away from the fold line 25 towards the distal ends 26 of the clamping spring 15. As will be seen in FIG. 2A, the effect of this is that, in the side sectional view of the clamping spring 15 shown in FIG. 2A, the lower edge 40 is inclined relative to the fold line 25. In the loosely held state, the clamping spring 15 rests on a horizontal upper surface 41 of the side wall portions 16 of the carrier (shown in FIG. 1). Because of the loose fit of the clamping spring 15 in its rest position, the effect of the inclined lower edge 40 is that the clamping spring 15 rests on the upper surface 41 in an inclined position as shown in FIG. 2A. The lower end of the fold line 25 extends slightly into the interior space of the carrier 14, whereas the upper end of the fold line 25 is in a retracted position within the interior of the sub-frame 22. The reason for this rest position will be explained more fully hereinafter, but is generally in order to facilitate insertion of the disk drive unit 12 into the carrier 14.

There will now be described with reference to FIGS. 1 and 5 the operation of the spring units 21 in clamping a disk drive unit 12 into the carrier 14. In FIG. 5 there is shown a tester rack 42 for housing disk drive units for testing. The rack 42 provides a plurality of bays 43 each having side rails 44 (shown in FIG. 1) which locate in the space between the upper portion 30 and base portion 29 of each sub-frame 22 of the carrier 14. Each rail 44 extends inwardly to an extent of about one third of the thickness of the spring unit 21, that is to say extends inwardly to about the position of the dotted line R—R in FIG. 2B. The effect of this is that when the carrier 14 is fully installed and engaged with the rails 44, the clamping springs 15 are pushed inwardly by the rails 44 (against the retracting bias of the positioning springs 37) and protrude inwardly into the space of the carrier. Also the effect of the rails, which are of substantially rectangular cross-section, is that the clamping springs 15 are positioned upright with the fold lines 25 vertical, and are not inclined as indicated in the rest position in FIG. 2A. As seen in FIG. 1, the distal ends of the rails 44 are tapered at 45. The effect of this is that when the carrier 14 is inserted into the rack 42 by sliding engagement with the rails 44, the tapered distal end 45 of each rail engages smoothly with the curled ends 26 of the spring unit 21, and pushes the clamping springs 15 inwardly by the effect of the insertion of the carrier into the rack.

There will now be described the overall operation of the insertion of a disk drive unit 12 into the carrier 14, and the insertion of the carrier 14 into the rack 42. First, with the carrier 14 withdrawn from the rack (and the rails 44 of FIG. 1 not present) the disk drive unit 12 is inserted into the carrier 14 by a downward vertical movement. Because the clamping springs 15 are inclined (FIG. 2A) with the upper part of each spring 15 hidden inside the sub-frame 22, the disk drive unit 12 can be lowered without any damage to the sides of the disk drive unit, by engagement with sharp upper edges of the springs 15. As the disk drive unit is lowered, the clamping springs 15 are moved outwardly and assume a vertical position, with the fold line 25 vertical and lying alongside and adjacent to the sides of the disk drive unit 12. In this position the disk drive unit 12 is loosely held inside the carrier 14, and the springs 15 do not clamp the disk drive unit relative to the carrier 14.

The overall sides of the carrier 14 are formed by the side wall portions 16, and the sub-frames 22, but a clear space is left on either side of the carrier 14 in the region between the sub-frames 22. The purpose of this clear region is to allow, in an automated system, the disk drive unit 12 to be gripped at the centre of the sides of the main body 13 by a robotic gripping device which can lift and manoeuvre a disk drive unit. Thus in an automated system, to be described hereinafter, the disk drive unit may be lowered into the carrier by a vertical movement.

After the disk drive unit 12 has been placed in the carrier 14, the carrier 14 is then presented to the tester rack 42, and engaged with the rails 44 as has been described above. The carrier 14 is then pushed home into the rack 42, and the clamping springs 15 are moved inwardly by the rails 44, so that the disk drive unit 12 is firmly clamped by the clamping springs 15 being compressed. This compression takes place by the bend at the bend line 25 being opened by pressure between the side of the disk drive unit main body 13 and the curled ends 26 bearing against the inner faces of the rails 44. The stiffness of the clamping springs 15 is very much greater than that of the positioning spring 37, which plays no part in exerting the clamping force on the disk drive unit.

Figure 3:
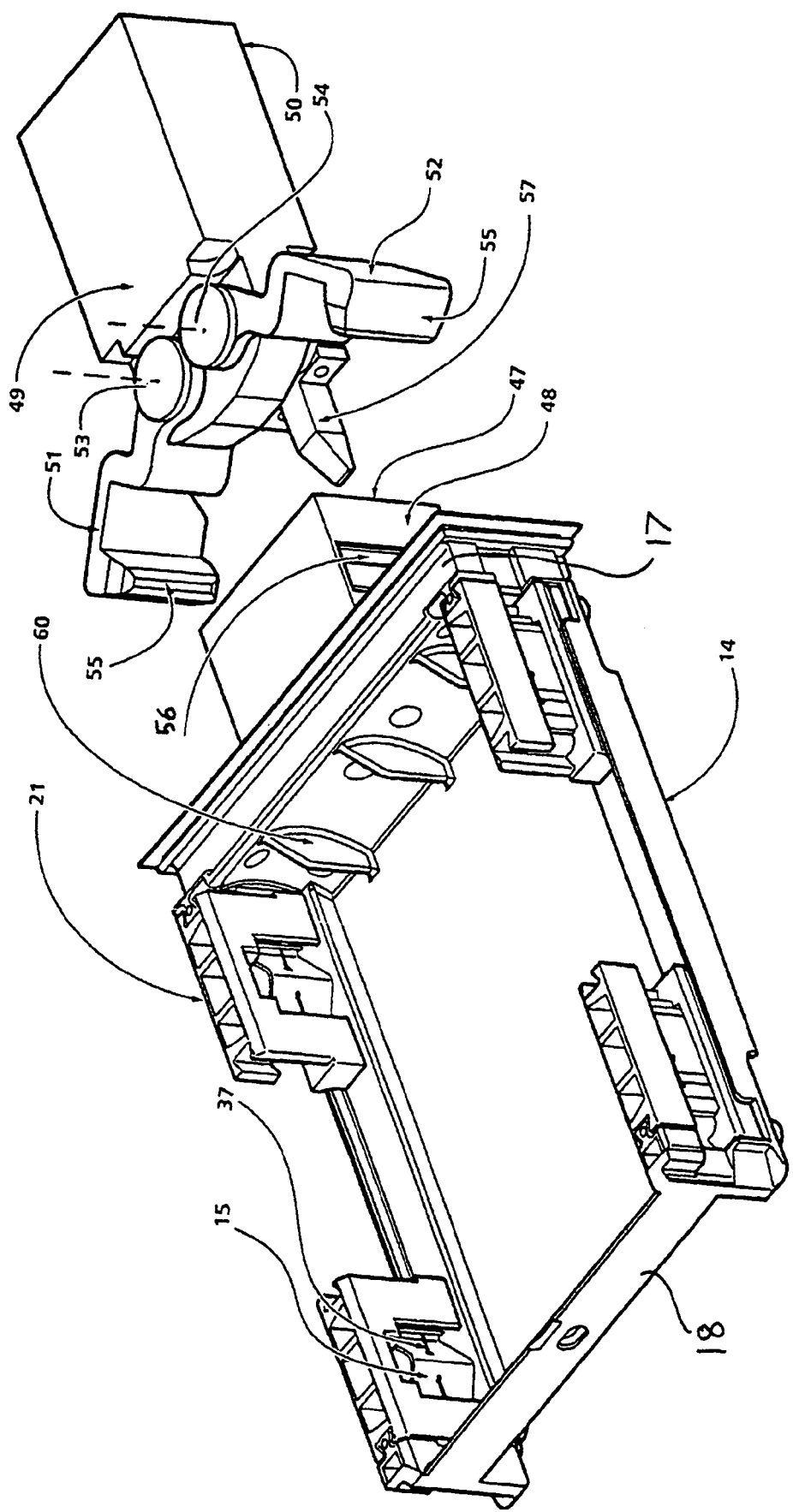
FIG. 3 is a diagrammatic perspective view from above of the mounting of the preceding Figures, together with an end-gripping device of a robot arm for moving the mounting.

During insertion of the carrier into the rack 42, electrical connection is made between electrical connectors (not shown) on the inner, rear end of the disk drive unit and corresponding electrical connectors provided in the inner end region of each bay 43. In prior art arrangements where a disk drive unit has been rigidly clamped in a tester rack (for example as discussed above with reference to WO 97/06532) it has been necessary to provide that the electrical connector in the rear of the bay 43 has a floating mounting, to allow the connector to mate with the other connector when the disk drive unit is rigidly clamped. However in the embodiment shown in the Figures of the present invention, this is not necessary. The electrical connector on the tester rack, and the electrical connector on the disk drive unit, may each be rigidly mounted. A suitable tapered lead-in is provided at each connector, so that any slight misalignment due to tolerances, is taken up by movement of the entire disk drive unit relative to the carrier 14. Because the clamping springs 15 allow a small amount of movement, whilst retaining the required clamping characteristics, the tolerances can be taken up by movement of the entire disk drive unit, rather than by movement of electrical connectors in a floating mounting relative to the tester rack. This allows simplification in the manufacture of the tester rack, with consequent savings in manufacturing costs, and maintenance costs. Referring to FIG. 3, the disk drive unit 12 is located inside the space in the carrier 14, longitudinally by the rear wall 18 and by three projecting ribs 60 which project from the inside of the front portion 17.

In FIGS. 2C, 2D and 2E there is shown a modification of the retaining device 15 as shown in FIGS. 2, 2A and 2B. In FIGS. 2C, 2D and 2E, components which correspond to components in FIGS. 2, 2A and 2B are indicated by the same reference numeral, but primed. Thus in FIGS. 2C, 2D and 2E, the retaining device 15' consists of a clamping spring 15' generally of the same shape as that shown in FIGS. 2, 2A and 2B, but with the lower edge 40' perpendicular to the bend line 25' and to the rounded ends 26', rather than being inclined as shown in FIG. 2A. Also, in this arrangement, the positioning of the positioning spring 37', and the dimensions of the various components of the sub-frame 22', are selected to be such that the positioning spring 37' holds the clamping spring 15' in a position towards the surfaces 27' and 27A' of the sub-frame 22', as shown in FIG. 2D. The clamping spring 15' is held with the bend line 25 not protruding into the space defined by the carrier 14 (FIG. 1). When the disk drive is lowered into the carrier 14 damage to the sides of the disk drive by the top of the clamping spring 15' is avoided because the spring is held within the sub-frame 22 by the positioning spring 37'. At this stage, i.e. before the carrier 14 is pushed into the receiving frame 8 (FIG. 5), the disk drive unit is placed loosely inside the carrier 14 without any locating force exerted by the clamping springs 15'. Thus the difference between the two forms of retaining device shown in FIGS. 2, 2A and 2B and FIGS. 2C, 2D and 2E, is that in the former embodiment the inclination of the clamping springs 15 produces the effect that there is a small gripping force exerted on the disk drive in the carrier even before the carrier 14 is inserted into the receiving frame 8, whereas in the modified arrangement of FIGS. 2C, 2D and 2E, no retaining force is acting upon the disk drive unit until the carrier is inserted into the receiving frame. The modification of FIGS. 2C, 2D and 2E is simpler to manufacture than the embodiment of FIGS. 2A and 2B. Apart from the difference explained, the two forms of the retaining device operate in the same manner, by effecting the operational retention of the disk drive unit after the carrier 14 is inserted into the receiving frame, and the rails 44 push the clamping springs 15 inwardly.

It is a feature of the embodiments of the invention which have been described that each resilient member 15 is movably mounted on the carrier 14 by a floating mounting in which the resilient member is loosely held in the wall of the carrier. The resilient member is mounted so as to allow movement of the resilient member 15 as a whole relative to the carrier. Also, because the resilient member 15 is mounted in an opening in the wall of the carrier 14, each resilient members 15 can secure the disk drive unit 12 in the receiving frame 8 by acting directly between the disk drive unit 12 and the receiving frame 8. In previously known arrangements resilient devices have been used to secure a disk drive unit in a receiving frame, either by acting between the wall of the receiving frame and the carrier, or between the carrier and the disk drive unit, or both. The arrangement described embodying the present invention is simpler and more effective in securing the disk drive unit.

In the embodiment described with reference to the drawings, a number of features combine to give an advantageous arrangement. The action of sliding the carrier 14 into the receiving frame causes the springs 15 to be compressed by means of the rails 44, which have a taper at the leading edge to facilitate a progressive clamping action. The single action of installing the carrier tray containing the disk drive unit into the receiving frame enables the electrical connector (not shown) at the rear of the disk drive unit to align and connect with the corresponding connector in the receiving frame. The positioning spring 37, which is a hair spring, retracts the clamping spring 15 when the carrier is out of the frame, to protect the disk drive unit from damage that may be caused if the disk drive unit were to contact the upper surfaces of the clamping springs 15. The floating mounting of the springs 15 and the flexibility of the clamping springs 15 enables the disk drive unit to have a degree of lateral movement, to permit the final alignment of the electrical connectors in a lateral direction. The provision of lateral movement of the disk drive unit against the clamping springs provides that manufacturing tolerances can be allowed for without the need for a floating electrical connector at the rear of the receiving bay. The overall arrangement illustrated has a low space requirement. The carrier tray contains all of the clamping mechanism so that it is not necessary to suspend operation of an overall test system to service the clamping mechanism. The clamping mechanism can be serviced individually for each carrier.

It is to be appreciated that although in the embodiments illustrated and described hereinbefore there are shown four retaining devices 15 positioned approximately one at each corner of the carrier 14, numerous other arrangements can be provided in accordance with the invention. For example although it is preferred that at least one retaining device 15 is provided on each side of the carrier 14, at least some of the advantages of the invention can be obtained by providing a single retaining device 15 on one side of the carrier 14, with one or more fixed locations on the other side of the carrier 14 projecting from the side walls of the carrier 14 and locating against the side of the disk drive unit. In such a case it will be appreciated that the disk drive unit will be located between one or more fixed locations on one side of the carrier 14, and will be located on the other side of the disk drive unit by the single floating retaining device 15 on the other side.

Numerous other arrangements can be made, for example two floating retaining devices 15 on one side of the carrier, and a single floating retaining device 15 on the other side of the carrier; two floating retaining devices 15 on one side of the carrier 14, and a single fixed location contact on the other side projecting from the carrier 14 to contact with the side of the disk drive; or two floating retaining devices 15, positioned one on each side of the carrier 14.

Figure 4:
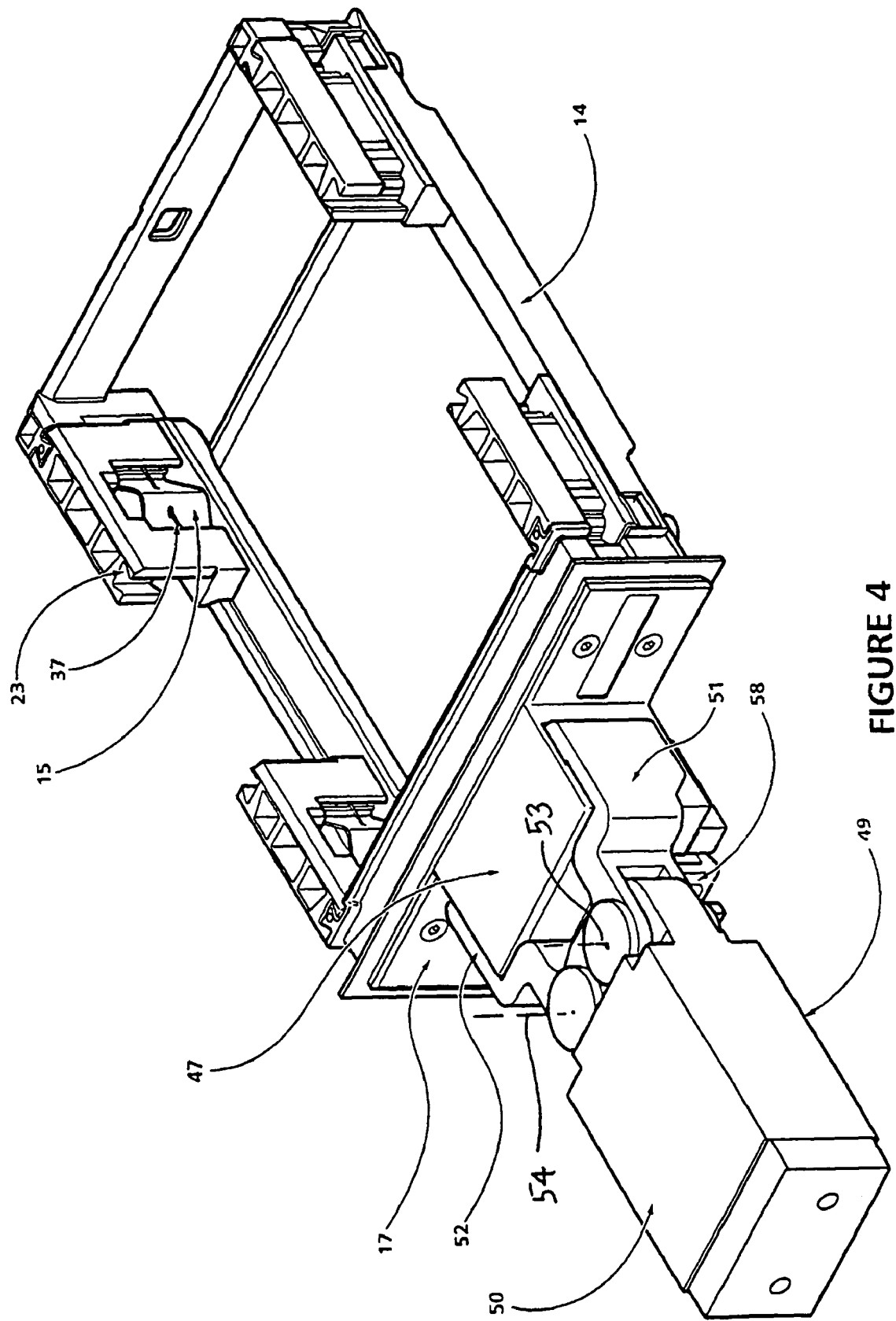
FIG. 4 is a diagrammatic perspective view from above of the apparatus of FIG. 3, shown from the front and shown with the gripping device gripping a coupling structure which projects outwardly from a front of the mounting.

There will now be described with reference to FIGS. 3 and 4, an automated system for handling the carrier 14 shown in the preceding figures. The front portion 17 of the carrier 14 has a coupling structure 47 projecting outwardly from the front of the carrier 14 and including side portions 48 adapted to be gripped by an automated robotic gripping device 49 for moving the carrier into and out of the tester rack 42. The robotic gripping device 49 comprises an arm end 50 extending from a robotic arm (not shown) capable of controlled three dimensional movement, and a pair of gripping claws 51 and 52. The claws are movable by a rotary movement about two spaced apart vertical axes 53 and 54 on rotary bearings (not shown) mounted on the arm end 50. Each claw 51, 52 has at its distal end a rectangular, tapered, projection part 55 which is of a cross-section and shape such as to co-operate with a corresponding rectangular indentation 56 on the side portion 48 of the coupling structure 47. The sides of the indentation 56 are tapered to correspond to the tapered shape of the claw ends 55 so that a tapered lead-in is provided as the claws 51 close to bring the locking projections 55 into mating engagement with the indentations 56.

At the front of the robotic gripping device 49 is a projecting finger 57 adapted to co-operate with a latch 58 (FIG. 1) forming part of the coupling structure 47. The latch 58 has a control lever 59 which is flexible to allow up and down movement relative to the main part of the coupling structure 47. When the lever 59 is raised upwardly, the latch (not shown) is released. When the lever 59 is released to its downward rest position, the latch is engaged. The relative positions of the indentations 56, and the claw ends 55, and the finger 57, are such that when the claws 52 and 51 are closed and the claw ends 55 are engaged fully with the indentations 56, the finger 57 raises the lever 59 and releases the latch. The purpose of the latch is to lock the carrier 14 into the tester rack, or into any other receiving frame having the rails 44 into which the carrier 14 is inserted.

There will now be described the method steps used in the automated handling of a disk drive unit. Considering a carrier 14 as shown in FIG. 3, but containing a disk drive unit 12 as shown in FIG. 1A, the carrier is approached by the robotic gripping device 49 with the claws 52 open as shown in FIG. 3. The arm end 50 is brought towards the front 17 of the tray and the projecting finger 57 engages with the latch lever 59 and raises the lever so as to put the latch in the unengaged position. The claws 52 and 51 are rotated to position the claw ends 55 into the indentations 56. The arm end 50 lifts the carrier 14 with the disk drive unit to the tester rack 42 and slides the carrier 14 into a bay 43. FIG. 4 shows the arm end 50 carrying the carrier 14, with the claws 55 engaged with the coupling structure 47. When the carrier has been pushed home into the rack, the claws 51 and 52 are opened and the arm end 49 is reversed to remove the projecting finger 57 from engagement with the lever 59 so that the latch mechanism 58 secures the carrier 14 into the frame in which it has been inserted.

To remove a carrier and disk drive unit from the tester rack, the procedure is reversed. The arm end 50 is moved towards the coupling structure 47 until the projecting finger 57 has been fully engaged with the lever 59 to release the latch 58. The claws 51 and 52 are then closed into the indentations 56, and the arm end 50 is moved backwards, to withdraw the carrier.

Figure 6:
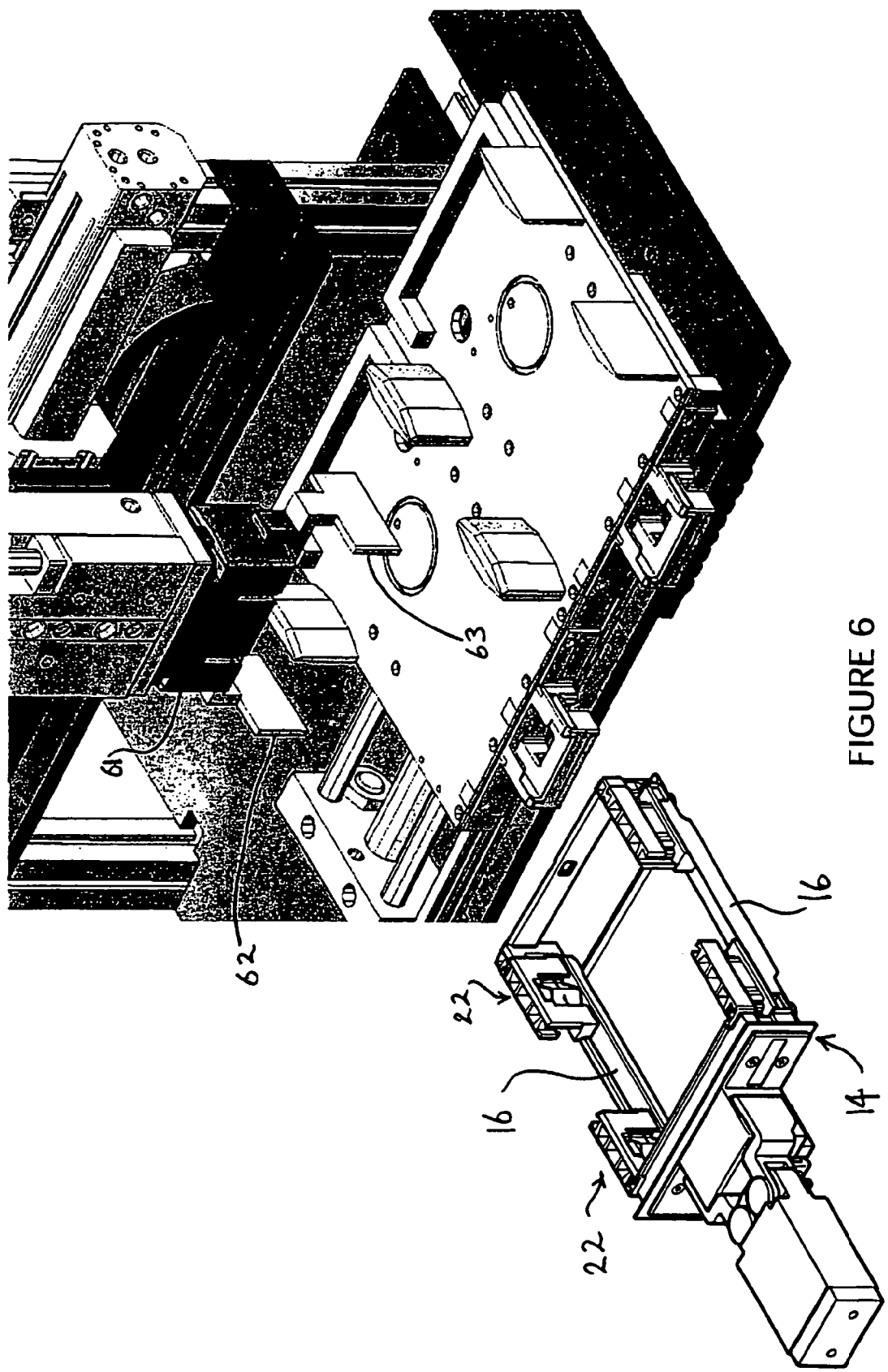
FIG. 6 is a diagrammatic perspective view of a side-gripping device of a robot arm for moving the mounting.

FIG. 6 illustrates an earlier stage in the automated process, whereby the disk drive unit 12 can be inserted into and removed from a carrier 14. As has been described previously, the overall sides of the carrier 14 are formed by the side wall portions 16, and the sub-frames 22, but a clear space is left on either side of the carrier 14 in the region between the sub-frames 22. The purpose of this clear region is to allow, in the automatic system, the disk drive unit 12 to be gripped at the centre of the sides of the main body 13 by a robotic gripping device 61 shown in FIG. 6 which can lift and manoeuvre a disk drive unit. Thus in the automated system the disk drive unit may be lifted from an entry presentation position by flat side-gripping elements 62 and 63 of the robotic device 61, may be lifted and manoeuvred to a position vertically above a carrier 14, and may then be lowered into the carrier with the side gripping elements 62, 63 of the robotic device 61 having a clearance at each side between the sub-frames 22. The side gripping elements 62, 63 are then released and the robotic device 61 removed. The carrier 14 is then lifted and manoeuvred, by the further robotic device 49.

It is to be appreciated that the tester rack 42 is shown merely by way of example of a frame into which the carrier 14 may be inserted. The rails 44 may be provided in any other frame which is required, for example in a test apparatus which can accommodate only a single disk drive unit for testing, or alternatively into a frame of equipment to be used by an end user, such as a data storage apparatus comprising a rack of disk drives in computing equipment. In other arrangements the rails may be provided in a further component which is itself a carrier and may be moved by a robotic transport device. The latch mechanism 58 may be used to lock the carrier 14 in any of these forms of frame.

The invention claimed is:

1. A mounting for a disk drive unit having a data storage disk, a movable disk head, and a main body supporting the disk and disk head, the mounting comprising:
    a carrier for carrying a disk drive unit during required movement of the disk drive unit, the carrier defining a space into which the disk drive unit can be inserted, and the carrier being adapted to be inserted with the disk drive unit into a receiving frame for operational use; and
    at least one retaining device mounted on the carrier for securing the disk drive unit in the receiving frame when the carrier is inserted into the frame; in which the or each retaining device is movably mounted on the carrier to allow movement of the device as a whole relative to the carrier, and the or each retaining device is arranged to secure the disk drive unit in the receiving frame by acting directly between the disk drive unit and the receiving frame, in which the or each retaining device has a portion which protrudes inwardly towards the said space for the disk drive unit and which is inclined to a perpendicular to a floor of the carrier, the inclination being in a sense such that the insertion of a disk drive unit into the space causes the disk drive unit to engage with the inclined portion of the retaining device, and to progressively move the retaining device outwardly as the disk drive unit is inserted into the space.

2. A mounting according to claim 1, in which the or each retaining device is arranged to act between the disk drive unit and the receiving frame in use, by the effect of compression of the retaining device between the disk drive unit and the carrier.

3. A mounting according to claim 2, in which the or each retaining device is arranged to be compressed between the disk drive unit and the receiving frame by the effect of the movement of the carrier into the receiving frame.

4. A mounting according to claim 1, including at least one said retaining device mounted on each side of the carrier.

5. A mounting according to claim 1, in which the or each retaining device is movable between a first retracted position in which the retaining device is retracted wholly or partially outside the said space in the carrier, allowing the disk drive unit to be inserted into the carrier, and a second operating position in which the retaining device extends into the said space in the carrier and bears against the disk drive unit to a greater extent than in the first position.

6. A mounting according to claim 5, in which the or each retaining device includes an outwardly extending actuating surface adapted to cooperate with a portion of the receiving frame, in such a way that when the carrier is located in the frame, the portion of the frame bears against the said actuating surface and pushes the retaining device inwardly to bear against the disk drive unit which is located in the carrier.

7. A mounting according to claim 1, in which the or each retaining device is mounted in a wall of the carrier and extends inwardly towards the said space in the carrier for the disk drive and outwardly to engage the receiving frame when the carrier is inserted in the receiving frame.

8. A mounting according to claim 7, in which the retaining device has a portion which extends outwardly into a recess in the side of the carrier which recess is adapted to cooperate with a supporting rail on the receiving frame such that when the carrier is inserted into the receiving frame, the rail engages with the outwardly protruding portion of the retaining device, and compresses the retaining device between the rail and the disk drive unit in the carrier.

9. A mounting according to claim 1, including four said retaining devices positioned with two retaining devices towards the front of the carrier and two retaining devices towards the rear of the carrier, relative to the direction of insertion of the carrier into the receiving frame, each side of the carrier having an opening exposing the side of the disk drive unit when the disk drive unit is in the carrier, the opening being shaped to allow the disk drive unit to be deposited into or lifted from the carrier by gripping the exposed sides of the disk drive unit.

10. A mounting according to claim 1, in which the carrier has a coupling structure projecting outwardly from a front of the carrier adapted to be engaged by a robotic device for moving the carrier into and out of the frame.

11. A mounting according to any preceding claim 1, in combination with a receiving frame into which the carrier can be inserted with a disk drive unit for operational use of the disk drive unit.

12. A mounting according to claim 11, in which the receiving frame comprises a tester rack adapted to receive a plurality of carriers with respective disk drive units for testing the disk drive units.

13. A mounting according to claim 11, in which the receiving frame comprises a data storage assembly adapted to receive a plurality of carriers with respective disk drive units for operational use of the disk drive units for data storage.

14. A mounting according to claim 11, in which the receiving frame comprises a frame of a computer adapted to receive a single carrier with its associated disk drive unit for data processing.

15. A mounting according to claim 1, in which each retaining device comprises a resilient member.

16. A mounting according to claim 15, in which each resilient member is formed of a sheet of resilient material.

17. A mounting according to claim 16, in which the sheet of resilient material has at least one bend line about which the sheet is bent to provide two portions of the sheet inclined to each other at an obtuse angle, the resilience of the resilient member being provided by compressing of the resilient member by opening of the obtuse angle.

18. A mounting according to claim 17, in which the resilient member is positioned so as to act against an outer side of the disk drive unit when it is inserted in the carrier, the said bend line or lines being arranged in a plane or planes substantially parallel to the outer side of the disk drive unit when it is inserted into the carrier.

* * * * *